(12) United States Patent
Li

(10) Patent No.: US 12,732,892 B2
(45) Date of Patent: Sep. 8, 2026

(54) ACCESS CONTROL METHOD, AND COMMUNICATION DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 594 days.

(21) Appl. No.: 18/024,446

(22) PCT Filed: Sep. 7, 2020

(86) PCT No.: PCT/CN2020/113833
§ 371 (c)(1),
(2) Date: Mar. 2, 2023

(87) PCT Pub. No.: WO2022/047799
PCT Pub. Date: Mar. 10, 2022

(65) Prior Publication Data
US 2023/0337114 A1 Oct. 19, 2023

(51) Int. Cl.
*H04W 48/08* (2009.01)
*H04W 48/16* (2009.01)

(52) U.S. Cl.
CPC .......... *H04W 48/08* (2013.01); *H04W 48/16* (2013.01)

(58) Field of Classification Search
CPC .............................. H04W 76/28; Y02D 30/70
USPC ........................................................ 455/434
See application file for complete search history.

(56) References Cited

U.S. PATENT DOCUMENTS

2012/0039171 A1 2/2012 Yamada et al.
2019/0045577 A1* 2/2019 Kim ..................... H04W 76/19
2019/0208570 A1* 7/2019 Shrivastava .......... H04W 76/28
2019/0357119 A1* 11/2019 Hong .................... H04L 1/1614
2020/0396611 A1* 12/2020 Rajadurai ............ H04W 12/06
2021/0243683 A1* 8/2021 Harada ................ H04W 24/02
2021/0400532 A1* 12/2021 Zhou .................... H04W 24/02

FOREIGN PATENT DOCUMENTS

CN 102137433 A 7/2011
CN 102238689 A 11/2011
CN 102892178 A 1/2013
CN 103096416 A 5/2013
CN 104322108 A 1/2015
CN 107528678 A 12/2017
CN 109275174 A 1/2019
CN 111432500 A 7/2020
KR 10-2011-0094408 A 8/2011

OTHER PUBLICATIONS

Chinese Office Action issued on Sep. 21, 2022 for Chinese Patent Application No. 20208002360.9.
Chinese Decision of Rejection issued on Jul. 28, 2023 for Chinese Patent Application No. 202080002360.9.
Chinese Supplemental Search Report issued on Jul. 24, 2023 for Chinese Patent Application No. 202080002360.9.

* cited by examiner

*Primary Examiner* — Fabricio R Murillo Garcia
(74) *Attorney, Agent, or Firm* — Volpe Koenig

(57) ABSTRACT

An access control method includes: controlling a preset user equipment (UE) to initiate access on different occasions.

16 Claims, 4 Drawing Sheets

Base station

UE

S111: independently configure delay values of access for different categories of preset UE S120: issue the delay values by means of broadcast information; or unicast the delay values by means of dedicated information Control preset user equipment (UE) to initiate access on different occasions

S110

ACCESS CONTROL METHOD, AND COMMUNICATION DEVICE AND STORAGE MEDIUM

CROSS REFERENCE TO RELATED APPLICATION

The present application is a U.S. National Stage of International Application No. PCT/CN2020/113833, filed on Sep. 7, 2020, the contents of all of which are incorporated herein by reference in their entirety for all purposes.

BACKGROUND

Structures of access control (AC) barring parameters are provided for each public land mobile network (PLMN), each access category, and each access identity.

SUMMARY

A first aspect of an example of the disclosure provides an access control method. The method includes: controlling preset user equipment (UE) to initiate access on different occasions.

A second aspect of an example of the disclosure provides an access control method. The method is applied to preset UE and includes: initiating access according to access control (AC) barring parameters, with at least some of the preset UE initiating the access on different occasions.

A third aspect of an example of the disclosure provides a communication device. The communication device includes a processor, a transceiver, a memory, and an executable program stored on the memory and capable of being run by the processor, and when the processor runs the executable program, the method shown in any one of the technical solutions in the first aspect and the second aspect is executed.

A fourth aspect of an example of the disclosure provides a computer storage medium. The computer storage medium stores an executable program, and after the executable program is executed by a processor, the method shown in any one of the technical solutions in the first aspect and the second aspect may be implemented.

It should be understood that the above general description and the following detailed description are illustrative and explanatory merely, and cannot limit examples of the disclosure.

BRIEF DESCRIPTION OF THE DRAWINGS

Accompanying drawings here are incorporated into the description as a constituent part of the description, illustrate examples conforming to the disclosure, and serve to explain principles of examples of the disclosure along with the description.

FIG. 6 is a schematic structural diagram of an access control apparatus shown according to an example;

FIG. 7 is a schematic structural diagram of an access control apparatus shown according to an example;

DETAILED DESCRIPTION

Examples will be described in detail here and illustratively shown in the accompanying drawings. When the following description relates to accompanying drawings, unless otherwise specified, the same numeral in different accompanying drawings denotes the same or similar element. Implementations described in the following examples do not denote all implementations consistent with examples of the disclosure. On the contrary, the implementations are merely examples of an apparatus and a method consistent with some aspects of examples of the disclosure as detailed in the appended claims.

Terms used in examples of the disclosure are merely to describe particular examples, and are not intended to limit examples of the disclosure. Singular forms such as “a/an” and “this” are used in examples of disclosure, and the appended claims are also intended to include plural forms unless otherwise clearly stated in the context. It should also be understood that the term “and/or” used here refers to and contains any or all possible combinations of one or more of the associated listed items.

It should be understood that although terms “first”, “second”, “third”, etc. may be employed in examples of the disclosure to describe various information, such information should not be limited to these terms. These terms are merely used for distinguishing the same category of information from each other. For example, first information could also be referred to as second information, and similarly, second information could also be referred to as first information, without departing from the scope of examples of the disclosure. Depending on the context, the word “if” as used here can be interpreted as “in the case that”, “under the condition that”, or “in response to determining”.

The disclosure relates to, but is not limited to, the technical field of wireless communication, and particularly relates to an access control method, a communication device, and a storage medium.

Figures 1, 2:
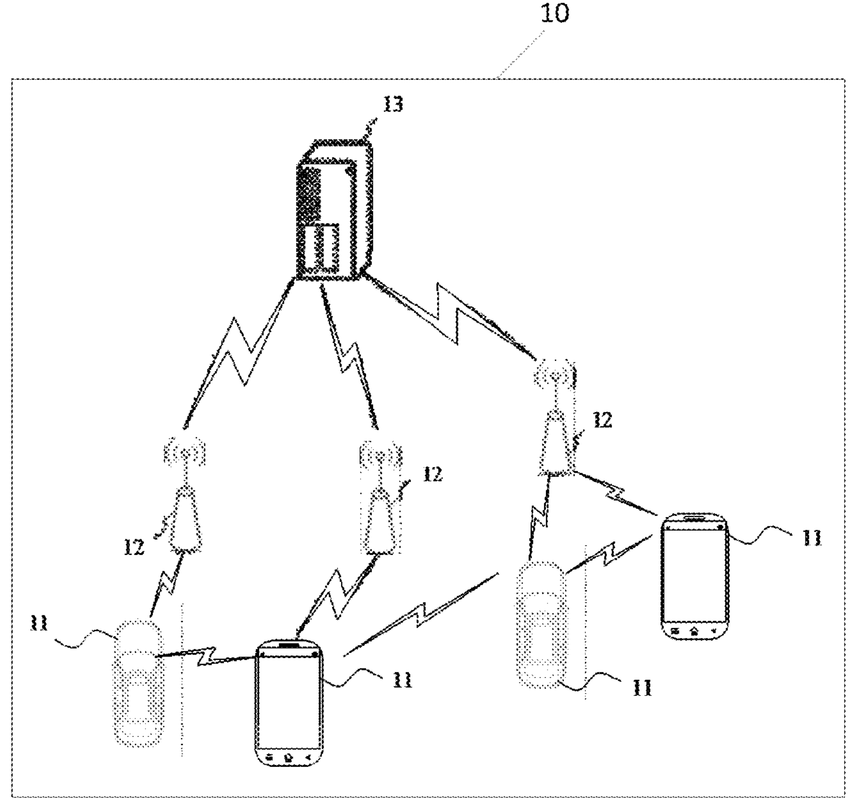
FIG. 1 is a schematic structural diagram of a wireless communication system shown according to an example.
FIG. 2 is a schematic flow diagram of an access control method shown according to an example.
Figure 3:
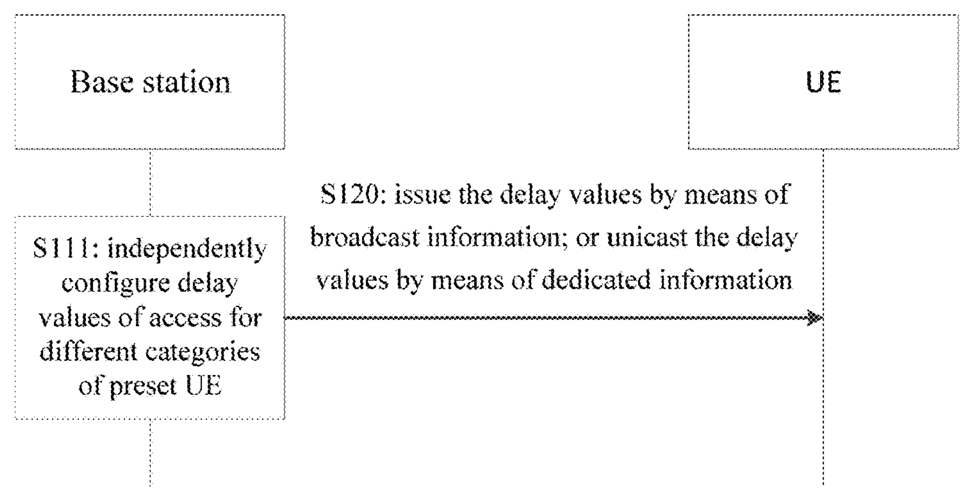
FIG. 3 is a schematic flow diagram of an access control method shown according to an example.

With reference to FIG. 1, a schematic structural diagram of a wireless communication system according to an example of the disclosure is shown. As shown in FIG. 1, the wireless communication system 10 is a communication system based on a cellular mobile communication technology, and the wireless communication system 10 may include several pieces of user equipment (UE) 11 and several base stations 12.

The UE 11 may refer to a device that provides voice and/or data connectivity for a user. The UE 11 may be in communication with one or more core networks by means of a radio access network (RAN), and the UE 11 may be an internet of things UE, for example, a sensor device, a mobile phone (or referred to as a cellular phone), and a computer with internet of things UE, may be, for example, a stationary, portable, pocket-sized or hand-held apparatus, an apparatus built in a computer, or a vehicle-mounted apparatus, may be, for example, a station (STA), a subscriber unit, a subscriber station, a mobile station, a mobile, a remote station, an access point, a remote terminal, an access terminal, a user terminal, a user agent, a user device, or UE. Alternatively, the UE 11 may be a device of an unmanned aerial vehicle.

Alternatively, the UE 11 may be a vehicle-mounted device, for example, an on-board computer having a wireless communication function, or a wireless communication device externally connected to an on-board computer. Alternatively, the UE 11 may be a roadside device, for example, a street lamp, a signal lamp, or other roadside devices having a wireless communication function.

The base station 12 may be a network-side device in a wireless communication system 10. The wireless communication system 10 may be the 4th generation mobile communication (4G) system, which is also referred to as a long term evolution (LTE) system, or the wireless communication system 10 may be a 5G system, which is also referred to as a new radio (NR) system or a 5G NR system. Alternatively, the wireless communication system 10 may be a next generation system of the 5G system. An access network of the 5G system may be referred to as new generation-radio access network (NG-RAN), or a machine category communication (MTC) system.

The base station 12 may be an evolved base station (eNB) used in a 4G system. Alternatively, base station 12 may be a base station (gNB) with a centralized and distributed architecture in a 5G system. In the case that the base station 12 has a centralized and distributed architecture, the base station generally includes a central unit (CU) and at least two distributed units (DUs). The central unit is provided with protocol stacks of a packet data convergence protocol (PDCP) layer, a radio link control (RLC) layer, and a media access control (MAC) layer. The distributed unit is provided with a protocol stack of a physical (PHY) layer. A particular example of the base station 12 is not limited to an example of the disclosure.

The base station 12 may be in wireless connection with the UE 11 by means of a wireless air interface. In different examples, the wireless air interface may be a wireless air interface based on 4G; the wireless air interface may be a wireless air interface based on 5G, for example, the wireless air interface is a new radio; or the wireless air interface may be a wireless air interface based on next generation mobile communication of 5G.

In some examples, the UE 11 may be in connection to each other in an end to end (E2E) manner, for example, scenarios such as vehicle to vehicle (V2V) communication, vehicle to infrastructure (V2I) communication, and vehicle to pedestrian (V2P) communication in vehicle to everything (V2X) communication.

In some examples, the above wireless communication system 10 may further include a network management device 13.

The several base stations 12 are connected to the network management device 13 separately. The network management device 13 may be a core network device in a wireless communication system 10, for example, the network management device 13 may be a mobility management entity (MME) in an evolved packet core (EPC). Alternatively, the network management device may be other core network devices, such as a serving gateway (SGW), a public data network gateway (PGW), a policy and charging rules function (PCRF), or a home subscriber server (HSS). An implementation form of the network management device 13 is not limited to an example of the disclosure.

According to a conclusion of NR access barring in R15, existing structures of AC barring parameters are provided for each public land mobile network (PLMN), each access category and each access identity. The following table gives an example where the maximum number of PLMN is 6, the maximum number of access categories is 64, and the maximum number of access identities is 16.

TABLE 1

| Instances of AC barring parameters | | | |
|---|---|---|---|
| PLMN identities (id) | Access categories | Access identities | AC barring parameters |
| PLMN id 1 | Access category 1 | Access id 0 | xxx |
| | Access category 1 | Access id 1 | xxx |
| | Access category 1 | Access id 2 | xxx |
| | . . . | . . . | . . . |
| | Access category 1 | Access id 15 | xxx |
| | . . . | . . . | . . . |
| | Access category 63 | Access id 15 | xxx |
| . . . | . . . | . . . | . . . |
| PLMN id 6 | . . . | . . . | . . . |
| | Access category 63 | Access id 15 | xxx |

According to 3GPP TS 24.301, access categories may include at least one of: originating signalling; emergency calls; originating multimedia telephony (MMTEL) voice; originating MMTEL video; originating short message service over internet protocol (SMSoIP); originating SMS; terminating calls; originating calls; and mobile originating circuit switched (CS) fallback.

As a category of user identities, access identities may be understood as attributes of UE, for example, 0-9 represent normal users, and 11-15 represent high priority users.

The definition of the AC barring parameters in the table is as follows, random numbers and barring effective duration are defined for non-special user identities, and bitmaps are used for service of special user identities.

```
  UAC-BarringInfoSetList::=          SEQUENCE (SIZE(1..maxBarringInfoSet))
OF UAC-BarringInfoSet
  UAC-BarringInfoSet::=             SEQUENCE {
    uac-BarringFactor                   ENUMERATED {p00, p05, p10, p15,
p20, p25, p30, p40,
                                                        p50, p60, p70, p75,
p80, p85, p90, p95},
    uac-BarringTime                     ENUMERATED {s4, s8, s16, s32, s64,
s128, s256, s512},
    uac-BarringForAccessIdentity        BIT STRING (SIZE(7))
}
```

Thus, a basic AC barring check process is to determine access categories of UE, obtain AC barring parameters, and carry out the AC barring check. With regard to AC barring parameters, random numbers are generally used for normal users (0-9), and bitmaps are used for high priority users (11-15).

In an example, AC barring parameters will be defined in the system information block (SIB) 1, that is, the remaining minimum system information (RMSI).

In current 3rd generation partnership project (3GPP) standardization, it is proposed that a new terminal category is referred to as reduced capability UE or NR-lite or redcap terminal for short. Such an apparatus is similar to an internet of things device in long term evolution (LTE), and the apparatus based on 5G NR-lite generally is required to satisfy requirements as follows: cost and complexity are low; and main application scenarios are factory sensors, or video surveillance and wearable devices. The above two device categories are generally heavily and densely deployed in a network. According to a current discussion result, most companies reach a consensus that it is required to introduce new access identities for specific terminal categories of redcap, such as scenarios of factory access identities. It is even possible to introduce more access identities for refined access identity categories.

According to an existing mechanism, if the access identities are in the form of a bitmap, a network may change AC barring parameters. For example, if original 0 changes into 1, upon receiving an indication of system information update, a redcap user may obtain SIB 1 at a boundary of system information modification, and a large number of users carry out update at the boundary of system information modification at the same time, such that a large number of users initiate calls at the same time to cause service burst, causing network congestion. Thus, user account control (UAC) of redcap categories is enhanced here.

As shown in FIG. 2, an access control method according to an example of the disclosure includes step S110.

Step S110 includes controlling preset UE to initiate access on different occasions.

The preset UE may be various categories of communication terminals that may access a cellular mobile communication network, and specifically may be various intelligent devices. The intelligent devices include, but are not limited to, at least one category of: intelligent household appliances, typical intelligent household appliances including: intelligent water meters, intelligent electricity meters, intelligent gas meters and/or home monitoring devices; industrial sensing devices, which include, but are not limited to, manufacturing monitoring devices; road monitoring devices, for example, monitors for various intersections; and security devices in a cell or plant area, for example, video and/or audio monitors.

Most of the time, these devices do not have much data to be reported, and are generally in low energy consumption states such as an idle state or an inactive state, with a small amount of data cached, and the data is reported only when enough data is cached or a reporting period is reached.

For example, if each household in a cell has intelligent water meters, intelligent electricity meters, and intelligent gas meters, due to similar categories of these devices and similar involved services, these devices are extremely likely to have the same access level. For example, all buildings in a cell are within a coverage area of the same cell, and there are many users in the cell and many intelligent devices installed in the cell. For example, there are as many as 500 intelligent water meters, and if the 500 intelligent water meters initiate access at the same time, access congestion is extremely likely to be caused. Thus, if random access is initiated after access control is carried out on the basis of the same access level, a large amount of access congestion will still be caused.

Thus, in an example of the disclosure, in order to reduce access congestion caused by rushing of a large amount of preset UE, the preset UE having the same access level will be controlled to initiate access on different occasions, such that the preset UE having the same access level may carry out access in batches on different occasions. Thus, the above congestion is reduced, service congestion at a wireless network side in a short time caused by congestion is reduced, load balance at an access network side is achieved, and service transmission quality at the access network side is ensured.

In an example, the preset UE may be one or more categories of UE having the same or similar terminal attributes, or one or more categories of UE having the same or similar service attributes.

In some examples, the preset UE includes: redcap UE. Redcap UE enhances mobile bandwidth relative to a mobile phone or wearable device of a user. Redcap UE is widely used in the fields of intelligent home, road monitoring, security, and industrial production. Thus, redcap UE is one category of the above preset UE.

There may be various kinds of access of the preset UE according to reasons, and two options are provided as follows: 1: access triggered by service data transmission; and 2: access triggered by system information update.

In the case of the access caused by service data transmission, the preset UE has the same access level, and AC barring parameters are as follows: bitmaps being used to indicate the UE having the access level. In an example of the disclosure, the preset UE is not all UE that is subjected to access control by means of access levels on the basis of bitmaps, but a large amount of UE, for example, internet of things devices widely used in various application scenarios. With regard to a small amount of UE that is subjected to access control by means of access levels on the basis of bitmaps, in order to suppress access congestion, a method in an example of the disclosure may be used as much as possible, and further access may be carried out on different occasions, so as to reduce access congestion.

In an example of the disclosure, AC barring parameters indicated by bitmaps at least include: indication information of an access level allowing access. For example, a bitmap has N bits in total, and any one of the N bits corresponds to an access level, and two bit values of one bit may be used to indicate two possibilities of allowing access and prohibiting access at the two access levels, respectively.

In the case of the access caused by a system information update, the preset UE is any UE in a cell that is required to obtain updated system information. For example, in the case of the access caused by system information update, the preset UE is any two pieces of redcap UE in a cell that are required to obtain updated system information.

Access of the preset UE may be shuffled through any of the following methods: trigger notification information of access of preset UE on different occasions such that the preset UE may obtain updated system information on different occasions upon receiving the notification information. On the one hand, access caused by a system information update may be shuffled. On the other hand, an occasion of obtaining system information carrying AC barring parameters is shuffled, and moreover, the UE having the same access level may obtain updated AC barring parameters carried by system information at different time points. Thus, access triggered by service data transmission initiated in a centralized manner on the basis of the same AC barring parameters is also shuffled.

Time domain parameters for shuffling access is introduced, for example, after access control based on AC barring parameters, one or more parameters are introduced in a time domain, so as to control access initiation of the preset UE with different access delay control. Such time domain parameters may include one or more delay values, and introduction of these delay values may shuffle access to obtainment of updated system information, and shuffle access to service data transmission, so as to reduce centralized access triggered by different reasons, and reduce congestion.

For another example, the UE may be controlled to obtain updated system information through access triggered by a next service, and the situation where access is independently initiated due to system information update is avoided. Since access triggered by services is extremely likely to occur on different occasions, through this method, access triggered by system information updates may be directly shuffled to different occasions. With regard to such system information update, an update notification of system information may be uniformly issued, or an update notification of system information may not be issued. For example, notifications of system information are unicasted, or update notifications of system information may not be issued.

In the case of access triggered by system information update, in the related art, after an update notification of system information is received, access is initiated at a time domain boundary position of the next system information update notification period after the update notification is received, so as to obtain updated system information. For example, through a notification information of system information, preset UE is triggered to immediately initiate access to obtainment of system information upon receiving the notification information, such that notification information is issued on different occasions, and the preset UE initiates access to obtainment of updated system information on different occasions. For another example, since system information notifications are issued on different occasions, the preset UE receives update notifications at different periods such that centralized access to obtainment of updated system information may be shuffled, reducing access congestion. Certainly, only examples are taken here, and particular examples can be different.

System information configured by a base station may or may not be updated. System information is updated during the system information update period.

If a base station will update system information in a next update period, system information being updated in a next period will be broadcasted or unicasted for user equipment in a current period. If shuffling is not carried out, the UE having the same access level and subjected to access control by means of access levels indicated by bitmaps will initiate, in a centralized manner, access triggered by service data transmission after acquiring system information at the start time of the next update period of system information, which is extremely likely to cause access congestion.

In an example of the disclosure, a base station side will control access of the preset UE, that is, access is initiated on different occasions through system information update and is not centralized near start time of a next update period.

Specific UE in some preset UE may periodically wake up, and is switched from an idle state or an inactive state to a connected state to request access and upload service data. If a large amount of preset UE has the same transmission period, a large amount of preset UE may initiate access at the same occasion. In order to alleviate congestion caused by centralized access, the centralized access of the preset UE at the same occasion is further shuffled, so as to reduce access congestion.

In an example, system information update includes: system information update caused by AC barring parameters.

The system information includes SIB 1; and/or SIB m, the m being a positive integer equal to or greater than 2.

In order to control access of the preset UE, a base station side may update AC barring parameters; and the AC barring parameters are carried in a system information block, such that update of the AC barring parameters will cause update of system information.

The AC barring parameters include, but are not limited to: access categories, access levels and/or timing duration of an access prohibiting timer, etc.

The AC barring parameters may be carried in SIB 1 or SIB m.

For example, the SIB 1 is broadcast information, and the broadcast information may be received in both an idle state and an inactive state. If the AC barring parameters are carried in SIB 1, it is only required to receive the SIB 1 in a broadcast time window of the SIB 1 by the preset UE. However, if by means of updated AC barring parameters in the SIB 1, after being subjected to access control by means of the AC barring parameters, the preset UE finds that access may be carried out, and some to-be-reported service data is cached in the preset UE and/or reporting time is reached, broadcast of the SIB 1 may still cause congestion of centralized access of the preset UE.

In another example, AC barring parameters may be carried in SIB m, and the SIB m may be any SIB other than the SIB 1, for example, an on demanded SIB. If AC barring parameters are carried in an on demanded SIB, since the preset UE having the same access level is extremely likely to send requests on different occasions to obtain updated AC barring parameters, even if updated AC barring parameters allow access of the UE, and a service reporting period is reached or an event triggering access occurs at this time, since time for obtaining AC barring parameters by different preset UE is shuffled, the preset UE having the same access level will still initiate access triggered on the basis of service data transmission on different occasions.

In summary, AC barring parameters of the preset UE may be carried in SIB 1 or SIB m.

For example, the SIB m is a dedicated system information block carrying AC barring parameters of the preset UE.

To further reduce the possibility that the preset UE having the same access level initiate access at the same time, a dedicated system information block is set to issue AC barring parameters, and the system information block may be an on demanded SIB.

In an example, the step S110 may include:

use paging downlink control information (DCI) to carry an update notification indicating the system information update.

Paging DCI of different UE is at different paging occasions (POs), that is, the preset UE having the same class is notified of system information update on different occasions. Paging DCI sent at different paging occasions may correspond to different access occasions. For example, UE in an idle state or an inactive state generally immediately obtains updated system information upon receiving paging DCI, and then initiates access triggered on the basis of to-be-transmitted service data. In this way, by issuing update notifications in a shuffled manner, the preset UE having the same class will be controlled to carry out access on different occasions.

In an example, the paging DCI further carries category indications; and the category indications indicate categories of preset UE that is required to immediately initiate obtainment of updated system information upon receiving the paging DCI.

Paging DCI internally includes one or more bits to indicate categories of preset UE that immediately initiate access upon receiving the paging DCI.

For example, intelligent home devices, monitoring devices, and/or industrial sensors all belong to a preset UE having the same access level, and specific categories of the preset UE that immediately initiate calls upon receiving paging DCI to obtain updated system information may be further differentiated.

For example, many preset UE may receive paging DCI at one paging occasion, then by means of category indications, only some categories of preset UE are allowed to immediately initiate access upon receiving the paging DCI, and request updated system information. The remaining preset UE may determine access occasions through other methods, and obtain updated system information after access. For example, the remaining preset UE may request access at the start time of the next update period of system information, and obtain system information after access. The remaining UE may request system information before borrowing access triggered by a next service, and carry out service transmission after requesting updated system information. If updated system information carries AC barring parameters, according to updated AC barring parameters, it is further determined whether access triggered by services is not initiated. In some examples, as shown in FIG. 2, the step S110 may include step S111.

Step S111 includes independently configuring delay values of access for different categories of preset UE, the delay values being used for delay duration of access after the preset UE is subjected to access control by means of the AC barring parameters.

In order to identify all UE having the same access level and AC barring parameters indicated by bitmaps as preset UE, and shuffle access of these preset UE, different delay values are introduced. For example, delay values may be random values randomly generated through a random algorithm. The random values may be any data between 0 and 1. If 100 random numbers are set between 0 and 1, access occasions of the preset UE may be shuffled to 100 access occasions.

For example, the preset UE may be divided into many categories, the same category of UE may have the same delay value, and different categories of preset UE have independent delay values, and thus may be set as the same or different. In an example of the disclosure, in order to further shuffle centralized access of preset UE at the same time point, different categories of preset UE may have different delay values.

In an example, due to the same access level, access control will be carried out on the basis of the same AC barring parameters, such that all preset UE having the same access level may carry out access. After the delay of independent delay values, centralized access to the preset UE may be broken, so as to implement decentralized access to the preset UE.

In an example of the disclosure, due to different delay values, access is carried out according to different delay values, such that notifications of service data transmission or system information update, etc., which trigger the preset UE to initiate access, may be sent on different occasions or at the same occasion.

In some examples, as shown in FIG. 2, the method further includes step S120.

In Step S120: issue the delay values by means of broadcast information; or unicast the delay values by means of dedicated information.

In some examples, the delay values may be pre-specified in a communication protocol, may be negotiated between a preset UE and a base station, or may be issued by the base station.

In an example of the disclosure, the delay values are issued by means of broadcast information, multicast information, or dedicated unicast information.

The dedicated unicast information includes, but is not limited to: radio control connection (RRC) information, etc.

In some examples, the step of controlling preset UE having the same access level to initiate access on different occasions includes: control the preset UE to access obtainment of the updated system information before initiating service transmission.

In an example of the disclosure, since before receiving notification information of system information or not receiving the notification information, and after sending access before service transmission, the preset UE does not directly transmit service data, but first requests whether there is updated system information each time or after a certain interval. If there is updated system information, the base station returns the updated system information. The preset UE carries out access control according to AC barring parameters in the updated system information, and carries out access triggered on the basis of service data transmission.

Since requirements for sending service transmission of the preset UE are not all centralized, when service transmission triggers access, the access triggered by service transmission is used as access to obtain updated system information, such that centralized access triggered by system information update is at least shuffled.

Further, if the preset UE carries out access before initiating service transmission to obtain updated system information, an update notification of system information for the preset UE may not be issued, so as to further reduce signaling.

Figure 4:
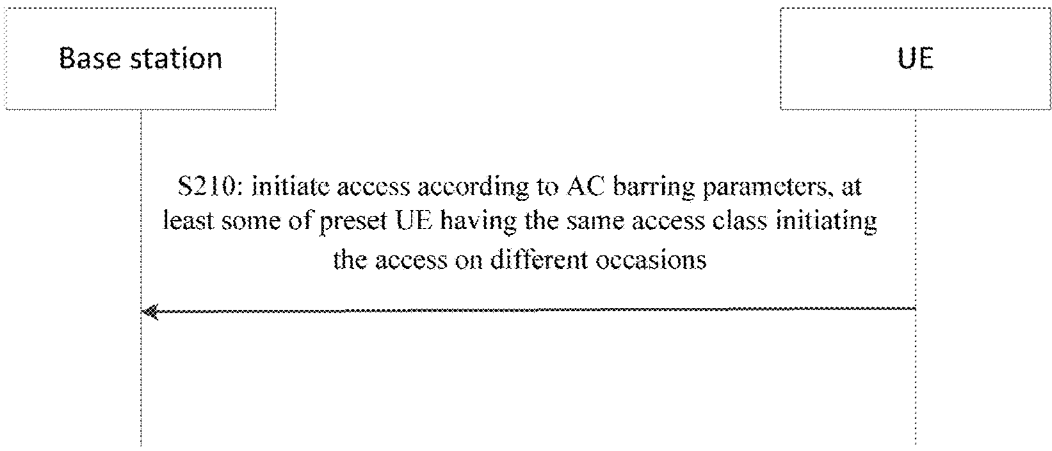
FIG. 4 is a schematic flow diagram of an access control method shown according to an example.

FIG. 4 shows an example of the disclosure provides an access control method. AC barring parameters applied to access control are as follows: bitmaps being used to indicate the preset UE having the access level. The method includes step S210.

In Step S210, initiate access according to AC barring parameters, at least some of the preset UE initiating the access on different occasions.

An example of the disclosure is applied to a preset UE.

In the case of the access caused by service data transmission, the preset UE has the same access level, and AC barring parameters are as follows: bitmaps being used to indicate the UE having the access level.

In the case of access caused by a system information update, the preset UE is any UE in a cell that is required to obtain updated system information.

The preset UE for access caused by any one of the above reasons may be redcap UE.

A base station may control a preset UE having the same access level to carry out initiation on different occasions, but with regard to a preset UE side and access initiated for service data transmission, the preset UE may still initiate access according to AC barring parameters. However, due to control by the base station, at least some of the preset UE initiate access at occasions different from that of other preset UE. Access here may be referred to as random access.

Since the number of the preset UE initiating access at the same time is reduced, congestion caused by simultaneous access initiation by a large amount of preset UE is reduced.

Figure 5:
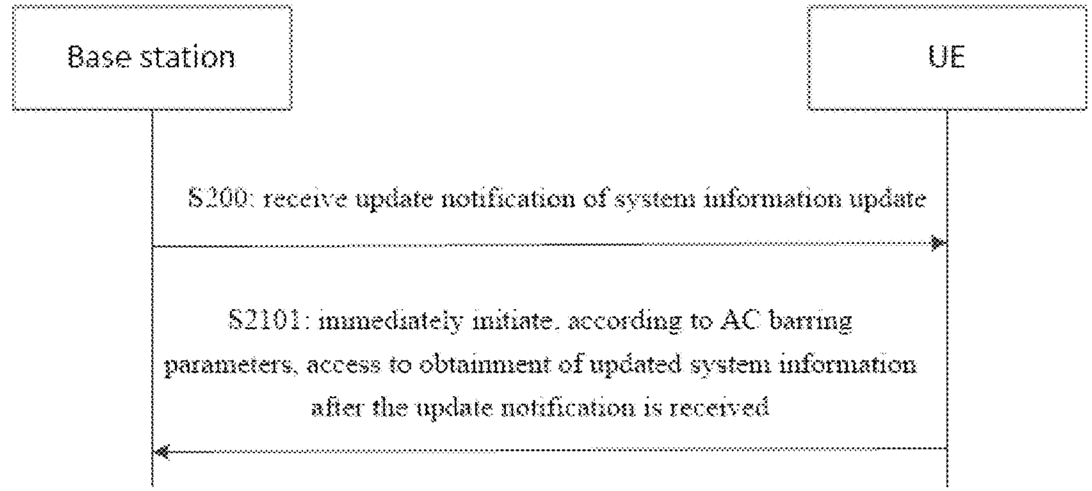
FIG. 5 is a schematic flow diagram of an access control method shown according to an example.

In some examples, as shown in FIG. 5, the method further includes:

Step S200: receive an update notification of system information update.

The step S210 may include: S2101: immediately initiate, according to the AC barring parameters, access to obtainment of the updated system information after the update notification is received.

In another example, updated system information carries updated AC barring parameters, and the updated system information is immediately obtained according to the update notification. The step of initiating access according to AC barring parameters includes: initiating, according to the updated AC barring parameters, access triggered by to-be-transmitted service data after the updated system information is obtained.

In an example, a system information block carrying the AC barring parameters is: SIB 1; and/or SIB m, the m being a positive integer equal to or greater than 2.

The SIB m may be an on demanded system information block.

In some examples, the step of receiving the update notification of the system information includes: receive paging DCI carrying the update notification.

In an example of the disclosure, an update notification of system information update is carried in paging DCI, and since even paging occasions of the preset UE having the same access level are shuffled, by shuffling the update notification of system information, the number of the preset UE having the same access level that is subjected to access control on the basis of AC barring parameters indicated by bitmaps and meanwhile initiates access is reduced.

In some examples, the paging DCI further carries category indications, and the category indications indicate categories of preset UE that immediately obtains the updated system information.

In an example of the disclosure, the paging DCI carries category indications, that is, a specific category of preset UE is designated, by means of the paging DCI, to be allowed to carry out access, and a specific category of preset UE is designated, by means of the category indications, to be prohibited from carrying out access such that centralized access of preset UE having the same class may be further reduced by means of the category indications.

In some examples, the step of initiating access to obtainment of the updated system information according to the update notification includes: initiating, in response to the category indications indicating that the updated system information is not required to be immediately obtained, access to obtainment of the updated system information at start time of a next update period of system information.

In an example of the disclosure, if the category indications carried in the paging DCI indicate that some of the preset UE are not required to immediately send access to obtainment of updated system information upon receiving the paging DCI, this part of the preset UE may obtain access initiation in a next update period of system information to obtain the updated system information.

In some examples, the step of initiating access according to AC barring parameters includes: carrying out access control according to the AC barring parameters; and initiating access after access is determined according to access control results and after delays equal to delays of delay values.

The preset UE is subjected to access control according to the AC barring parameters, and access results are divided into two categories: determining access and prohibiting access. If access is determined, access will not be immediately initiated, but will be initiated after delays equal to the duration of delay values, such that by means of the delay values, the preset UE having the access level and AC barring parameters indicated by bitmaps may initiate access on different occasions in batches.

In some examples, the method further includes: receiving broadcast information carrying the delay values; or receiving dedicated information carrying the delay values.

If access is initiated separately by means of delay values, it is required to obtain the delay values. There are many methods for obtaining delay values.

For example, the delay values may be written into a communication protocol, a preset UE may obtain the delay values by querying the communication protocol, or the delay values may be received from the base station side. There are many methods for issuing the delay values by the base station, for example, the delay values are sent to the preset UE by sending broadcast information, or unicasting dedicated information.

In some examples, the step of initiating access according to AC barring parameters includes: accessing, according to the AC barring parameters, obtainment of the updated system information before service data transmission is initiated.

Access triggered by service data is initiated according to the AC barring parameters to serve as access to obtainment of updated system information. Due to randomness of service data transmission, access to obtainment of updated system information may be shuffled.

As shown in FIG. 6, the disclosure provides an access control apparatus 100. The apparatus includes a control module 110 that is configured to control preset UE to initiate access on different occasions.

The access control apparatus 100 provided in an example of the disclosure may be applied to a base station.

The control module 110 may be used for controlling the preset UE having the same access level and AC barring parameters indicated by bitmaps to initiate access on different occasions through configurations of issuing notifications and/or including delay values, etc.

The control module 110 in an example of the disclosure may be a program module, and after the program module is executed by a processor, access control of the preset UE may be implemented.

In another example, the control module 110 may be a hardware and software combined module, and the hardware and software combined module may be various programmable arrays, which include, but are not limited to, field programmable arrays or complex programmable arrays.

In yet another example, the control module 110 may be a hardware module, which includes, but is not limited to: an application specific integrated circuit.

In some examples, the preset UE includes: redcap UE.

In the case of the access caused by service data transmission, the preset UE has the same access level, and AC barring parameters are as follows: bitmaps being used to indicate the UE having the access level.

In the case of the access caused by service data transmission, the preset UE has the same access level, and AC barring parameters are as follows: bitmaps being used to indicate the UE having the access level.

In some examples, system information update includes: a system information update caused by AC barring parameters.

In an example, the system information includes: SIB 1; and/or SIB m, the m being a positive integer equal to or greater than 2.

In some examples, AC barring parameters of the preset UE may be carried in the SIB 1 or the SIB m. In some examples, the SIB m is a dedicated system information block carrying AC barring parameters of the preset UE.

Here, the SIB m may be an on demanded system information block.

In some examples, the control module 110 is configured to use paging DCI to carry an update notification indicating the system information update.

In some examples, the paging DCI further carries category indications; and the category indications indicate categories of preset UE that is required to immediately initiate obtainment of the updated system information upon receiving the paging DCI.

In some examples, the control module 110 is configured to configure independent delay values for different categories of preset UE, the delay values being used for delay duration of access after the preset UE is subjected to access control on the basis of the AC barring parameters.

In some examples, the control module 110 is configured to issue the delay values by means of broadcast information; or by unicasting the delay values by means of dedicated information. In some examples, the control module 110 is configured to control the preset UE to access obtainment of the updated system information before initiating service transmission.

As shown in FIG. 7, an example of the disclosure provides an access control apparatus 200. The apparatus is applied to a preset UE and includes:

an access module 210 configured to initiate access according to AC barring parameters, at least some of the preset UE initiating the access on different occasions.

The access module 210 in an example of the disclosure may be a program module, and after the program module is executed by a processor, access control of the preset UE may be implemented.

In another example, the access module 210 may be a hardware and software combined module, and the hardware and software combined module may be various programmable arrays, which include, but are not limited to, field programmable arrays or complex programmable arrays.

In yet another example, the access module 210 may be a hardware module, which includes, but is not limited to: an application specific integrated circuit.

In an example, in the case of the access caused by service data transmission, the preset UE has the same access level, and AC barring parameters are as follows: bitmaps being used to indicate the UE having the access level.

In another example, in the case of access caused by a system information update, the preset UE is any UE in a cell that is required to obtain updated system information.

In an example, the apparatus further includes: a first receiving module configured to receive an update notification of a system information update. Also, the access module 210 is configured to immediately initiate, according to the AC barring parameters, access to obtainment of the updated system information after the update notification is received.

In an example, updated system information carries updated AC barring parameters, and the apparatus 200 further includes: a first receiving module configured to immediately obtain updated system information according to an update notification. The step of initiating access according to AC barring parameters includes: the access module further configured to initiate, according to the updated AC barring parameters, access triggered by to-be-transmitted service data after the updated system information is obtained.

In an example, the first receiving module is configured to receive paging DCI carrying an update notification.

In an example, the paging DCI further carries category indications, and the category indications indicate categories of preset UE that immediately obtains the updated system information.

In an example, the access module 210 is configured to initiate, in response to the category indications indicating that the updated system information is not required to be immediately obtained, access to obtainment of the updated system information at start time of a next update period of system information.

In an example, the access module 210 is configured to carry out access control according to AC barring parameters; and initiate access after access is determined according to access control results and after delays equal to delays of delay values.

In an example, the apparatus further includes: a second receiving module configured to receive broadcast information carrying the delay values; or receiving dedicated information carrying the delay values.

In an example, the access module 210 is configured to access, according to the AC barring parameters, obtainment of the updated system information before service data transmission is initiated.

When user equipment (that is, a user) having AC barring parameters issued by bitmaps updates system information, access is initiated in a decentralized manner.

In an example, bitmaps are used to indicate that UE having AC barring parameters is redcap terminals.

In order to enable the redcap UE to initiate request of obtaining updated system information on different occasions, options are provided as follows. Option 1: a system information update method of UE having AC barring parameters indicated by bitmaps is an instant update method. In the instant update method, the UE immediately initiates call (access) upon receiving an update notification of system information, so as to be switched from an idle state or an inactive state to a connected state, and requests a base station to send updated system information on a radio resource control (RRC) connection after being switched to the connected state.

Certainly, if the UE in the connected state receives a notification indicating system information update in this case, the UE may directly and immediately send an obtainment request on an established RRC connection, so as to obtain updated system information.

In the method of immediately initiating access to request for updated system information upon receiving an update notification, a method for issuing the update notification may be as follows: add an indication in existing paging DCI to indicate an update notification of system information update of a certain category of user equipment.

For example, systemInfomodification-redcap is added in the paging DCI, and redcap user equipment immediately obtains updated system information upon receiving an update notification of system information update.

| Bit sequence number | Short message |
|---|---|
| 1 | systemInfomodification<br>If set to 1: indication of a broadcast control channel (BCCH) modification other than SIB 6, SIB 7 and SIB 8. |
| 2 | etwsandcmasIndication<br>If set to 1: indication of an earthquake and tsunami warning system (ETWS) primary notification and/or an ETWS secondary notification and/or a confdration mondiale des activits subaquatiques (CMAS) Notification. |
| 3 | systemInfomodification-redcap<br>If set to 1: indication of a BCCH modification. |
| 34-8 | Not used in this release of the specification, and shall be ignored by UE if received |

Through this method, since users are evenly shuffled at different paging occasions (POs) by means of paging information, the UE obtains system information after hearing the paging information, which plays a role of call dispersion.

This mechanism may be implemented for specific access identities. That is, enhancement is carried out for different categories of users; and different indication bits are set for different categories of users in paging DCI of the paging information.

Option 2: An update notification of system information may be issued by means of the paging DCI in Option 1, and may be issued through an existing method.

In an example of the disclosure, a method for enabling user equipment carrying AC barring parameters by bitmaps to initiate obtainment of updated system information on different occasions may be to set delay values.

For example, upon receiving an update notification, UE may still initiate access to obtainment of updated system information at a boundary position of start time of a next update period of system information, but in order to reduce access congestion, each preset UE has a delay value. The delay values of the different preset categories of UE is independent, such that different preset UE is extremely likely to have different delay values, and access initiated by the preset UE on the basis of system information update is shuffled.

For example, the delay values are random numbers generated by a base station through a random algorithm.

In an example, random delay values, such as Nms, are reconfigured for different access identities for user equipment subjected to AC by means of bitmaps; and after a user carries out existing AC barring check, delay values are randomly generated between 0-Nms to delay call initiation.

The random delay values may be notified to a user by dedicated signaling or broadcast information, and in an example, is put it in paging DCI or system information.

Further, in order to reduce the situation that SIB 1 is update due to AC barring parameters, and then update of the SIB 1 is further affected, in an example of the disclosure, AC barring parameters of the user equipment carrying AC barring parameters by bitmaps are moved to other SIBs except for the SIB 1.

For example, in an example, the AC barring parameters are moved to a dedicated SIB for carrying AC barring parameters of the UE.

Through such as method for updating system information, the system information may be immediately updated on the basis of an update notification, or updated system information may be obtained through access triggered on the basis of service data transmission.

Option 3: A change of AC barring parameters of user equipment carrying AC barring parameters indicated by means of bitmaps will not affect a change indication of system information. In this way, a user may obtain the latest system information before initiating calls (that is, access) on the basis of service data transmission, and make a decision according to the latest AC barring parameters in this case.

An example of the disclosure provides a communication device. The communication device includes a processor, a transceiver, a memory, and an executable program stored in the memory and capable of being run by the processor, and when the processor runs the executable program, the access control method provided in any above technical solutions may be executed.

The memory may include various categories of storage media, and the storage medium is a non-transitory computer storage medium that may keep memorizing information stored thereon after the communication device is powered off. Here, the communication device includes a base station or user equipment.

The processor may be connected to the memory by means of a bus, etc., and is used for reading the executable program stored on the memory, specifically, for example, the method shown in any one of FIGS. 4-11.

An example of the disclosure provides a non-transitory computer storage medium. The non-transitory computer storage medium stores an executable program, and after the executable program is executed by a processor, the method shown in any above technical solutions, for example, at least one of the methods shown in FIGS. 2-4, 6 and 7 may be implemented.

Figure 8:
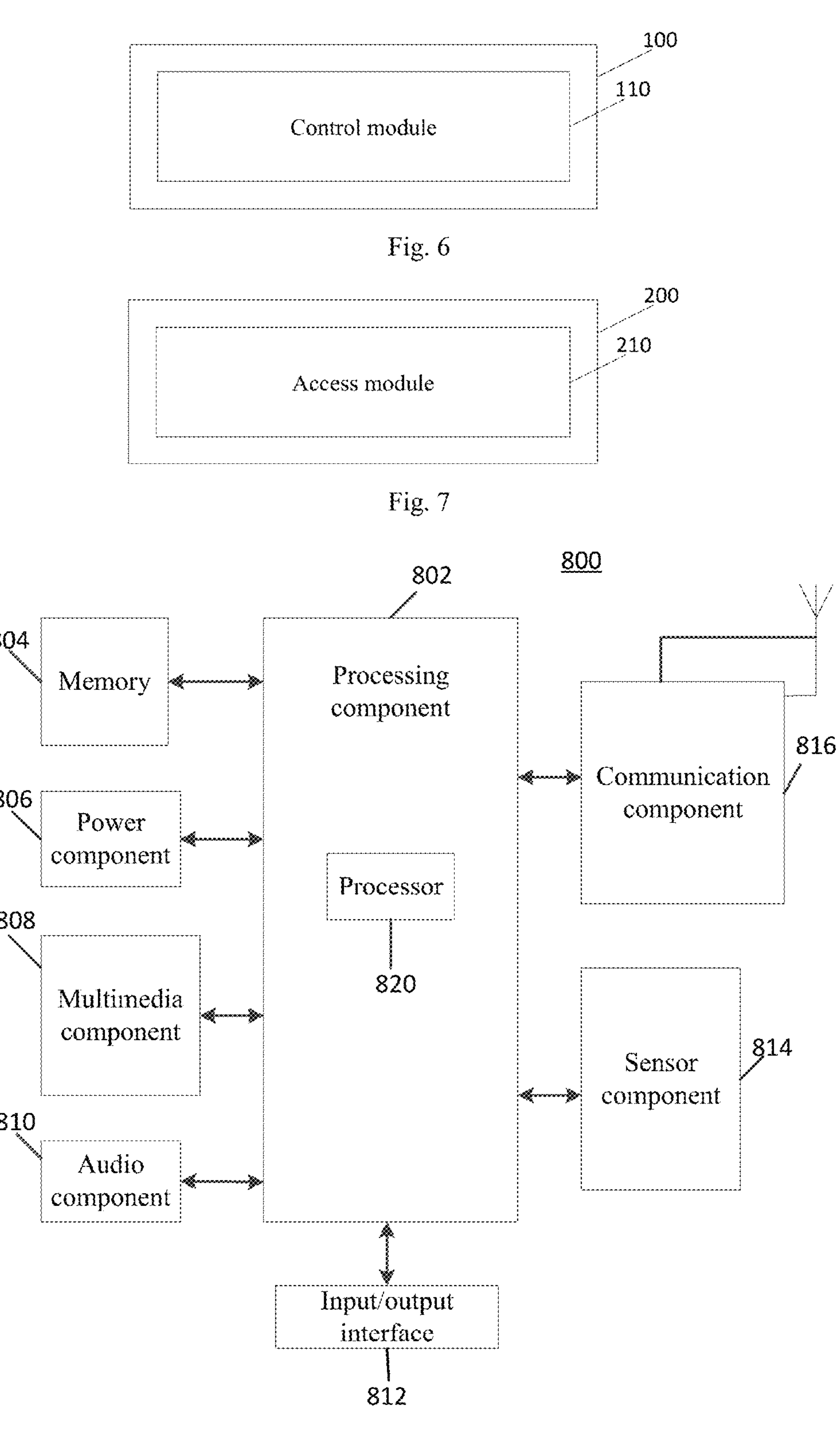
FIG. 8 is a block diagram of user equipment (UE) according to an example of the disclosure.

FIG. 8 is a block diagram of UE 800 shown according to an example. For example, the UE 800 may be a mobile phone, a computer, a digital broadcasting device, a message receiving and transmitting device, a game console, a tablet device, a medical device, a fitness device, a personal digital assistant, etc.

With reference to FIG. 8, the UE 800 may include one or more of the following assemblies: a processing assembly 802, a memory 804, a power supply assembly 806, a multi-media assembly 808, an audio assembly 810, an input/output (I/O) interface 812, a sensor assembly 814, and a communication assembly 816.

The processing assembly 802 typically controls overall operation of the UE 800, such as operations associated with display, telephone calls, data communication, camera operation and recording. The processing assembly 802 may include one or more processors 820 to execute instructions, so as to complete all or some of the steps of the above method. Further, the processing assembly 802 may include one or more modules, so as to facilitate interaction between the processing assembly 802 and other assemblies. For example, the processing assembly 802 may include a multi-media module, so as to facilitate interaction between the multi-media assembly 808 and the processing assembly 802.

The memory 804 is configured to store various categories of data, so as to support operations at the UE 800. Instances of such data include instructions for any application or method operating on the UE 800, contact data, phonebook data, messages, pictures, videos, etc. The memory 804 may be realized by any category of volatile or non-volatile storage devices or combinations thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 806 provides power for various assemblies of the UE 800. The power supply assembly 806 may include a power supply management system, one or more power supplies, and other assemblies associated with generation, management and power distribution of the UE 800.

The multi-media assembly 808 includes a screen that provides an output interface between the UE 800 and a user. In some examples, the screen may include a liquid crystal display (LCD) and a touch panel (TP). Under the condition that the screen includes a touch panel, the screen may be implemented as a touch screen, so as to receive an input signal from a user. The touch panel includes one or more touch sensors, so as to sense touches, swipes, and gestures on the touch panel. The touch sensor may not only sense a boundary of a touch or swipe, but also detect time and pressure associated with the touch or swipe. In some examples, the multi-media assembly 808 includes a front facing camera and/or a rear facing camera. When the UE 800 is in an operating mode, such as a shooting mode or a video mode, the front facing camera and/or the rear facing camera may receive external multi-media data. Each of the front facing camera and the rear facing camera may be a fixed optical lens system or have focusing and optical zooming capabilities.

The audio assembly 810 is configured to output and/or input audio signals. For example, the audio assembly 810 may include a microphone (MIC) that is configured to receive external audio signals when the UE 800 is in an operating mode, such as a call mode, a recording mode, and a voice recognition mode. The received audio signals may be further stored in the memory 804 or transmitted by means of the communication assembly 816. In some examples, the audio assembly 810 further includes a loudspeaker for outputting audio signals.

The I/O interface 812 provides an interface between the processing assembly 802 and peripheral interface modules, such as keyboards, click wheels and buttons. These buttons may include, but are not limited to: a home button, a volume button, a start button, and a lock button.

The sensor assembly 814 may include one or more sensors for providing status assessment of various aspects of the UE 800. For example, the sensor assembly 814 may detect an open/closed state of the UE 800, and relative positioning of assemblies, for example, a display and keypad of the UE 800. The sensor assembly 814 may further detect a change in position of the UE 800 or an assembly of the UE 800, presence or absence of contact between a user and the UE 800, orientation or acceleration/deceleration of the UE 800, and a temperature change of the UE 800. The sensor assembly 814 may include a proximity sensor configured to detect the presence of a nearby object in the absence of any physical contact. The sensor assembly 814 may further include a light sensor, such as a complementary metal oxide semiconductor (CMOS) or charge coupled device (CCD) image sensor for being used in imaging applications. In some examples, the sensor assembly 814 may further include an acceleration sensor, a gyroscopic sensor, a magnetic sensor, a pressure sensor, or a temperature sensor.

The communication assembly 816 is configured to facilitate wired or wireless communication between the UE 800 and other devices. The UE 800 may access a wireless network based on a communication standard, such as Wi-Fi, 2G, 3G, or a combination thereof. In an example, the communication assembly 816 receives a broadcast signal or broadcast related information from an external broadcast management system by a broadcast channel. In an example, the communication assembly 816 further includes a near-field communication (NFC) module, so as to facilitate short-range communication. For example, the NFC module may be realized on the basis of a radio frequency identification (RFID) technology, an infrared data association (IrDA) technology, an ultra wideband (UWB) technology, a Bluetooth (BT) technology, and other technologies.

In an example, the UE 800 may be realized by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, so as to be used for executing the above methods.

An example provides a non-transitory computer-readable storage medium including an instruction, such as a memory 804 including an instruction, and the instruction may be executed by the processor 820 of the UE 800, so as to implement the above method. For example, the non-transitory computer-readable storage medium may be an ROM, a random access memory (RAM), a CD-ROM, a magnetic tape, a floppy disk, an optical data storage device, etc.

Figure 9:
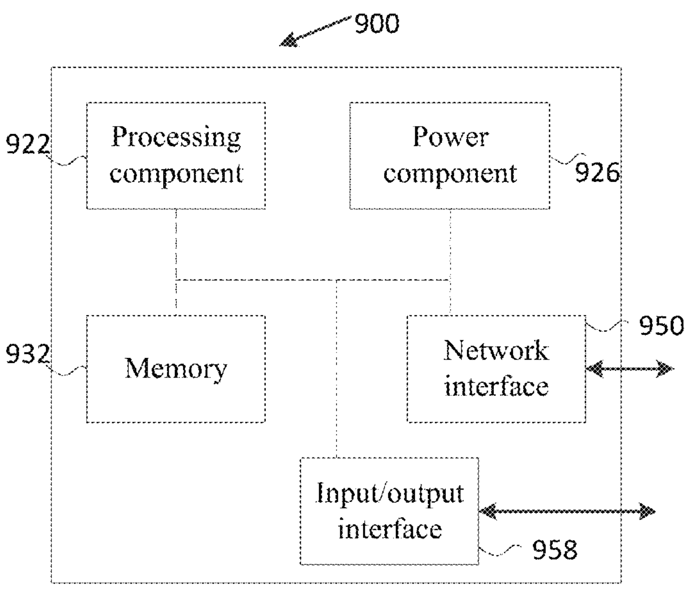
FIG. 9 is a schematic structural diagram of a base station according to an example of the disclosure.

As shown in FIG. 9, an example of the disclosure provides a base station. For example, the base station 900 may be provided as a network-side device. With reference to FIG. 9, the base station 900 includes a processing assembly 922, which further includes one or more processors, and memory resources represented by the memory 932 for storing an instruction that may be executed by the processing assembly 922, for example, an application. The application stored in the memory 932 may include one or more modules that each correspond to a set of instructions. In addition, the processing assembly 922 is configured to execute an instruction, so as to execute any above method applied to the base station, for example, the methods shown in FIGS. 2 and 3.

The base station 900 may further include a power supply assembly 926 configured to execute power supply management of the base station 900, a wired or wireless network interface 950 configured to connect the base station 900 to a network, and an input/output (I/O) interface 958. The base station 900 may operate an operating system stored in the memory 932, such as Windows Server™, Mac OS X™, Unix™, Linux™, FreeBSD™ and similar systems.

An example of the disclosure provides an access control method. The method may be illustratively applied to a network-side device and includes: determining access parameters of UE, different UE corresponding to different access parameters.

It should be noted that part of the example the same as the above examples will not be repeated again, that is, the solution of the example and the solution of any one of the above examples are formed on the basis of the same inventive concept. Thus, the technical details in each of the above examples are applicable to the example, and in the example, the same technical details will not be repeated. For example, categories of UE may be the same as that in the above examples; UE access reasons may be the same as that in the above examples; a method for shuffling access of UE may be the same as that in the above examples; and a method for updating system information configured by a base station may be the same as that in the above examples; etc. That is, as long as contrary technical details are not explicitly stated in the example, it is implied that technical details thereof are exactly the same as those in the above examples.

In the example, UE is expressed through a grouping method, but the principle thereof is the same as the principle of shuffling of the access of UE. In all examples of the disclosure, a system may include two or more UE groups; and a UE group may include one or more UEs. There may be many methods for grouping UE, for example: carry out grouping according to categories of UE, carry out grouping according to service categories of UE, carry out grouping according to positions of UE, carry out grouping according to performance of UE, etc.

In all examples of the disclosure, access parameters are used to indicate occasions on which UE groups initiate access. In all examples of the disclosure, each UE group has a different delay parameter of access. The delay parameters are similar to the delay values in the above examples, and are used for indicating occasions on which UE groups initiate access.

In an example of the disclosure, the access parameters may be sent to corresponding UE according to groups to which the UE belongs. The access parameters and the UE groups corresponding to the access parameters may also be sent through a group sending (for example, broadcast) method, such that UE receiving the access parameters determines whether the access parameters are the access parameters of the UE according to corresponding UE groups. In some examples, the access parameter may be a parameter, or may be an identity corresponding to a candidate access parameter in one or more preset candidate access parameters.

An example of the disclosure further provides an access control method. The method may be illustratively applied to UE and includes: receiving access parameters corresponding to UE groups to which UE belongs, different UE groups corresponding to different access parameters.

It should be noted that part of the example the same as the above examples will not be repeated again, that is, the solution of the example and the solution of any one of the above examples are formed on the basis of the same inventive concept. Thus, the technical details in each of the above examples are applicable to the example, and in the example, the same technical details will not be repeated. For example, categories of UE may be the same as that in the above examples; UE access reasons may be the same as that in the above examples; a method for shuffling access of UE may be the same as that in the above examples; and a method for updating system information configured by a base station may be the same as that in the above examples; etc. That is, as long as contrary technical details are not explicitly stated in the example, it is implied that technical details thereof are exactly the same as those in the above examples.

In the example, UE is expressed through a grouping method, but the principle thereof is the same as the principle of shuffling access of UE. In all examples of the disclosure, a system may include two or more UE groups; and a UE group may include one or more pieces of UE.

There may be many methods for grouping UE, for example: carry out grouping according to categories of UE, carry out grouping according to service categories of UE, carry out grouping according to positions of UE, carry out grouping according to performance of UE, etc.

In all examples of the disclosure, access parameters are used to indicate occasions on which UE groups initiate access. In all examples of the disclosure, each UE group has a different delay parameter of access. The delay parameters are similar to the delay values in the above examples, and are used for indicating occasions on which UE groups initiate access.

According to a first aspect of an example of the disclosure, an access control method is provided and including: controlling preset user equipment (UE) to initiate access on different occasions.

In one example, in the case of the access caused by service data transmission, the preset UE has the same access level, and access control (AC) barring parameters are as follows: bitmaps being used to indicate the UE having the access level.

In one example, the preset UE includes: reduced capability (redcap) UE.

In one example, the AC barring parameters are carried in system information.

In one example, the system information includes:

SIB 1; and/or SIB m, the m being a positive integer equal to or greater than 2.

In one example, the SIB m is a dedicated system information block carrying the AC barring parameters of the preset UE.

In one example, in the case of the access caused by system information update, the preset UE is any UE in a cell that is required to obtain updated system information.

In one example, the controlling preset UE to initiate access on different occasions includes: using paging downlink control information (DCI) to carry an update notification indicating the system information update.

In one example, the paging DCI further carries category indications, and the category indications indicate categories of preset UE that is required to immediately initiate obtainment of the updated system information upon receiving the paging DCI.

In one example, the controlling preset UE to initiate access on different occasions includes: configuring independent delay values for different categories of preset UE, the delay values being used for delay duration of access after the preset UE is subjected to access control based on the AC barring parameters.

In one example, the controlling preset UE to initiate access on different occasions further includes: issuing the delay values by means of broadcast information; or unicasting the delay values by means of dedicated information.

In one example, controlling preset UE having the same access level to initiate access on different occasions includes: controlling the preset UE to access obtainment of the updated system information before initiating service transmission.

According to a second aspect of an example of the disclosure, the method is provided and applied to preset UE, and including: initiating access according to AC barring parameters, at least some of the preset UE initiating the access on different occasions.

In one example, in the case of the access caused by service data transmission, the preset UE has the same access level, and the AC barring parameters are as follows: bitmaps being used to indicate the UE having the access level.

In one example, the method further includes: receiving an update notification of system information update, updated system information carrying updated AC barring parameters; and immediately obtaining the updated system information according to the update notification; and the initiating access according to AC barring parameters includes: initiating, according to the updated AC barring parameters, access triggered by to-be-transmitted service data after the updated system information is obtained.

In one example, in the case of the access caused by system information update, the preset UE is any UE in a cell that is required to obtain updated system information.

In one example, the method further includes: receiving the update notification of the system information update; and the initiating access according to AC barring parameters includes:

immediately initiating, according to the AC barring parameters, access to obtainment of the updated system information after the update notification is received.

In one example, a system information block carrying the AC barring parameters is: SIB 1; and/or SIB m, the m being a positive integer equal to or greater than 2.

In one example, the receiving an update notification of system information update includes: receiving paging DCI carrying the update notification.

In one example, the paging DCI further carries category indications, and the category indications indicate categories of preset UE that immediately obtains the updated system information.

In one example, the initiating access to obtainment of the updated system information according to the update notification includes: initiating, in response to the category indications indicating that the updated system information is not required to be immediately obtained, access to obtainment of the updated system information at start time of a next update period of system information.

In one example, the initiating access according to AC barring parameters includes: carrying out access control according to the AC barring parameters; and initiating access after access is determined according to access control results and after delays equal to delays of delay values.

In one example, further including: receiving broadcast information carrying the delay values; or receiving dedicated information carrying the delay values.

In one example, the initiating access according to the AC barring parameter includes: accessing, according to the AC barring parameters, obtainment of the updated system information before service data transmission is initiated.

According to a third aspect of an example of the disclosure, an access control apparatus, including: a control module configured to control preset UE to initiate access on different occasions.

According to a fourth aspect of an example of the disclosure, an access control apparatus, the apparatus is provided and applied to preset UE, and includes: an access module configured to initiate access according to AC barring parameters, at least some of the preset UE initiating the access on different occasions.

According to technical solutions provided in examples of the disclosure, the preset UE may be controlled to initiate access on different occasions such that the situation that the preset UE having the same access level initiate access in a centralized manner may be reduced, and access congestion may be reduced.

A person skilled in the art could easily conceive of other implementation solutions of the disclosure upon consideration of the description and the disclosure in practice. The disclosure is intended to cover any variations, uses or adaptive changes of the disclosure, which follow the general principles of the disclosure and include common general knowledge or customary technical means, which is not disclosed in the disclosure, in the art. The description and examples are to be regarded as illustrative merely, and the true scope and spirit of the disclosure are indicated by the following claims.

It should be understood that the disclosure is not limited to a precise structure that is described above and illustrated in accompanying drawings, and can have various modifications and changes without departing from the scope of the disclosure. The scope of the disclosure is limited by the appended claims merely.

What is claimed is:

1. An access control method, comprising:

controlling a plurality of preset user equipments (UEs) to initiate access on different occasions;

wherein in a case of access caused by service data transmission, the plurality of preset UEs have a same access level, and access control (AC) barring parameters include bitmaps being used to indicate the plurality of preset UEs having the access level;

wherein the controlling a plurality of preset UEs to initiate access on different occasions comprises:

controlling the plurality of preset UEs to access obtainment of updated system information before initiating service transmission, wherein the plurality of preset UEs have the same access level.

2. The method according to claim 1, wherein the plurality of preset UEs comprise: reduced capability (redcap) UE.

3. The method according to claim 1, wherein;

the AC barring parameters are carried in system information, the system information comprises at least one of a system information block (SIB) 1 or an SIB m, the m being a positive integer equal to or greater than 2, and the SIB m is a dedicated system information block carrying the AC barring parameters of the plurality of preset UEs.

4. The method according to claim 1, wherein the controlling a plurality of preset UEs to initiate access on different occasions comprises:

using paging downlink control information (DCI) to carry an update notification indicating a system information update.

5. The method according to claim 4, wherein the paging DCI further carries category indication, and the category indication indicates a category of a plurality of preset UEs that is required to initiate, without delay, obtainment of the updated system information upon receiving the paging DCI.

6. The method according to claim 1, wherein the controlling a plurality of preset UEs to initiate access on different occasions comprises:

configuring independent delay values for different categories of preset UE, the independent delay values being used for delay duration of access after the preset UE is subjected to access control based on access control (AC) barring parameters.

7. The method according to claim 6, wherein the controlling a plurality of preset UEs to initiate access on different occasions further comprises:

issuing the delay values by means of broadcast information;

or unicasting the delay values by means of dedicated information.

8. An access control method applied to a plurality of preset user equipments (UEs) and comprises:

initiating access according to access control (AC) barring parameters, at least some of the plurality of preset UEs initiating the access on different occasions;

wherein in a case of access caused by service data transmission, the plurality of preset UEs have a same access level, and the AC barring parameters include bitmaps being used to indicate the plurality of preset UEs having the access level;

wherein the initiating the access according to the AC barring parameters comprises:

accessing, according to the AC barring parameters, obtainment of updated system information before the service data transmission is initiated.

9. The method according to claim 8, wherein the method further comprises:

receiving an update notification of system information update, the updated system information carrying updated AC barring parameters; and obtaining, without delay, the updated system information according to the update notification; and the initiating access according to AC barring parameters comprises:

initiating, according to the updated AC barring parameters, access triggered by to-be-transmitted service data after the updated system information is obtained.

10. The method according to claim 9, wherein the method further comprises:

receiving the update notification of the system information update; and the initiating access according to AC barring parameters comprises:

initiating, without delay, according to the AC barring parameters, access to obtainment of the updated system information after the update notification is received.

11. The method according to claim 9, wherein the receiving an update notification of system information update comprises:

receiving paging downlink control information (DCI) carrying the update notification, wherein the paging DCI further carries category indication, and the category indication indicates a category of preset UE that obtains the updated system information without delay.

12. The method according to claim 11, wherein the initiating access to obtainment of the updated system information according to the update notification comprises:

initiating, in response to the category indication indicating that the updated system information is not required to be obtained without delay, the access to obtainment of the updated system information at start time of a next update period of system information.

13. The method according to claim 8, wherein a system information block carrying the AC barring parameters is at least one of:

a system information block (SIB) 1;

or an SIB m, the m being a positive integer equal to or greater than 2.

14. The method according to claim 8, wherein the initiating access according to AC barring parameters comprises:

carrying out access control according to the AC barring parameters; and initiating the access after the access is determined according to access control results and after delays equal to delays of delay values.

15. The method according to claim 14, further comprising:

receiving broadcast information carrying the delay values;

or receiving dedicated information carrying the delay values.

16. A communication device, comprising a processor, a transceiver, a memory, and an executable program stored on the memory and capable of being run by the processor, wherein when running the executable program, the processor is configured to:

control a plurality of preset user equipments (UEs) to initiate access on different occasions;

wherein in a case of access caused by service data transmission, the plurality of preset UEs have a same access level, and access control (AC) barring parameters include bitmaps being used to indicate the plurality of preset UEs having the access level;

wherein when running the executable program, the processor is further configured, when the controlling the plurality of preset UEs to initiate the access on the different occasions, control the plurality of preset UEs to access obtainment of updated system information before initiating service transmission, wherein the plurality of preset UEs have the same access level.

* * * * *